US012340699B2

(12) United States Patent
Ruelke et al.

(10) Patent No.: US 12,340,699 B2
(45) Date of Patent: Jun. 24, 2025

(54) DEVICE, SYSTEM, AND METHOD FOR INCIDENT AIR SPACE MANAGEMENT

(71) Applicant: MOTOROLA SOLUTIONS, INC., Chicago, IL (US)

(72) Inventors: Charles R. Ruelke, Chicago, IL (US); Abhaykumar Kumbhar, Chicago, IL (US); Peter H. Mills, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 256 days.

(21) Appl. No.: 17/883,467

(22) Filed: Aug. 8, 2022

(65) Prior Publication Data

US 2024/0046800 A1 Feb. 8, 2024

(51) Int. Cl.
*G08G 5/25* (2025.01)

(52) U.S. Cl.
CPC .................................... *G08G 5/25* (2025.01)

(58) Field of Classification Search
CPC .. G08G 5/0008; G08G 5/0013; G08G 5/0026; G08G 5/0043; G08G 5/0052; G08G 5/006; G08G 5/0069; G08G 5/0082
See application file for complete search history.

(56) References Cited

U.S. PATENT DOCUMENTS

| | | | | |
|---|---|---|---|---|
| 8,185,301 | B1 | 5/2012 | Simon | |
| 9,552,736 | B2 | 1/2017 | Taveira | |
| 9,626,874 | B1 | 4/2017 | Gupta et al. | |
| 10,217,369 | B2 | 2/2019 | Cui et al. | |
| 10,505,622 | B1 * | 12/2019 | Stein | H04W 4/40 |
| 2012/0143482 | A1 * | 6/2012 | Goossen | G08G 5/57 701/120 |

(Continued)

FOREIGN PATENT DOCUMENTS

| | | | |
|---|---|---|---|
| DE | 102018102112 | A1 * | 8/2019 |
| KR | 20160137442 | A * | 11/2016 |

OTHER PUBLICATIONS

DOD plan to counter small drones: interoperability, https://www.nextgov.com/emerging-tech/2021/02/dods-plan-counter-small-drones-hinges-interoperability/171813/, Published Feb. 2, 2021.

(Continued)

*Primary Examiner* — Rufus C Point
(74) *Attorney, Agent, or Firm* — PERRY + CURRIER INC.

(57) ABSTRACT

A device, system, and method for incident air space management is provided. A system includes a controller and a signaling unmanned aerial vehicle (SUAV) associated with a public-safety entity. The controller dispatches the SUAV to a location of a public-safety incident and generates a restricted airspace boundary for airspace, associated with the incident, within which the SUAV operates. The controller activates a restricted airspace beacon of the SUAV that correlates with the restricted airspace boundary. The SUAV broadcasts the restricted airspace beacon, indicating the restricted airspace boundary, relative to a current location of the SUAV. The restricted airspace beacon is operational in at least two modes: a stationary incident mode, during which the SUAV and the restricted airspace boundary are stationary relative to a fixed location of incident; and a mobile incident mode, during which the SUAV and the restricted airspace boundary are mobile and tracking a moving incident location.

20 Claims, 7 Drawing Sheets

(56) References Cited

U.S. PATENT DOCUMENTS

| | | | | |
|---|---|---|---|---|
| 2016/0225264 | A1* | 8/2016 | Taveira | H04W 4/021 |
| 2016/0244161 | A1 | 8/2016 | McClure | |
| 2017/0025022 | A1 | 1/2017 | Henry et al. | |
| 2017/0092109 | A1* | 3/2017 | Trundle | G05D 1/104 |
| 2017/0372617 | A1* | 12/2017 | Bruno | G01C 21/3826 |
| 2019/0266898 | A1* | 8/2019 | Cantrell | G08G 5/32 |
| 2020/0099441 | A1* | 3/2020 | Stein | G08G 5/59 |
| 2020/0272827 | A1* | 8/2020 | Morrow | G06T 7/11 |
| 2021/0327286 | A1 | 10/2021 | Stewart | |
| 2022/0076582 | A1* | 3/2022 | Borgyos | G08G 5/56 |

OTHER PUBLICATIONS

FCC UAS Remote Identification—https://www.faa.gov/uas/getting_started/remote_id/, Published Oct. 13, 2022.
ADS-B Beacon Encoding: https://www.faa.gov/air_traffic/publications/atpubs/atc_html/chap5_section_2.html, Published Apr. 21, 2022.
LTE X2 UE—https://www.sciencedirect.com/topics/engineering/s1-interface, Published Mar. 24, 2022.
CSA—Connectivity Standards Alliance—https://csa-iot.org, Published Apr. 21, 2022.

* cited by examiner

DEVICE, SYSTEM, AND METHOD FOR INCIDENT AIR SPACE MANAGEMENT

BACKGROUND OF THE INVENTION

Drone/Unmanned Aerial Vehicle (UAV) congestion over public-safety incidents is a common occurrence. For example, a public-safety UAV may be deployed over a public-safety incident, and other UAVs and/or manned aircraft, such as UAVs and/or helicopters, and the like, operated by media entities, may interfere with the public-safety UAV.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
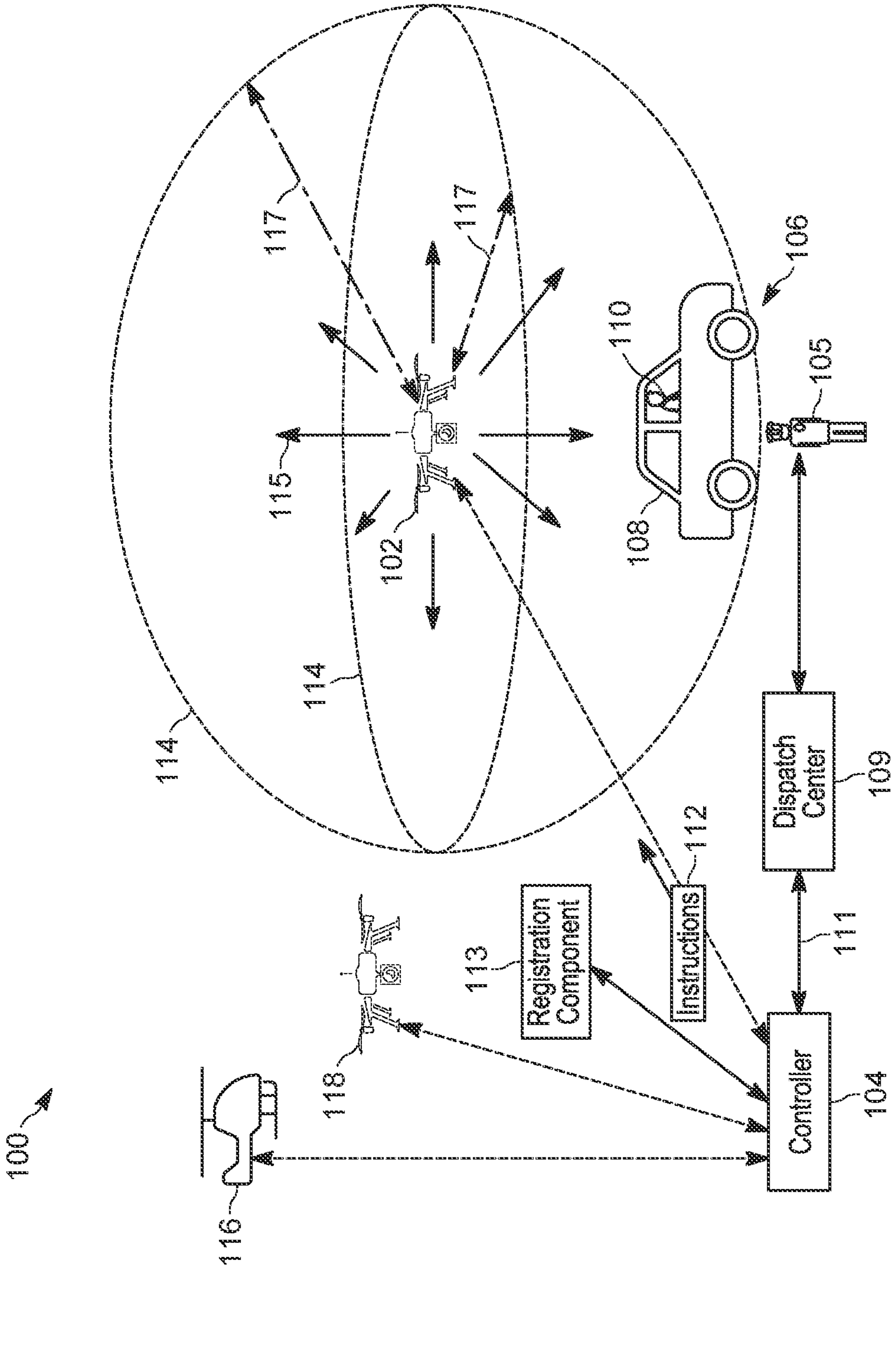
FIG. 1 is an incident air space management system in a stationary incident mode, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Drone/Unmanned Aerial Vehicle (UAV) congestion over public-safety incidents is a common occurrence. For example, a public-safety UAV may be deployed over a public-safety incident, and other UAVs and/or manned aircraft, such as UAVs and/or helicopters, and the like, operated by media entities, may interfere with the public-safety UAV. Thus, there exists a need for an improved technical method, device, and system for incident air space management.

Hence, provided herein is a device, system, and method for incident air space management. For example, an incident air space management system may include a signaling unmanned aerial vehicle (SUAV) associated with a public-safety entity and a controller associated with the public-safety entity. The SUAV may include any suitable unmanned aerial vehicle and/or drone that may be controlled and/or configured to monitor a public-safety incident. The controller may include any suitable communication device configured to communicate with and at least partially control operation of the SUAV. The incident air space management system may be used to augment existing public-safety operational workflows, and may operate in conjunction with, or independent of, existing public-safety dispatch command and control systems and processes. The SUAV may be located above a specified incident that has occurred, and/or may be actively occurring on the ground below the SUAV; the SUAV aerial position may be controlled to maintain an appropriate relative location above the incident which may be optimal for providing both appropriate coverage of the restricted air space above the incident, and situational awareness relative to both ground and in-flight activity proximate to the incident.

In general, the controller may dispatch the SUAV to a location of a public-safety incident and generate a restricted airspace boundary for airspace, associated with the public-safety incident, within which the SUAV operates. The controller may activate a wireless beacon located on the in-flight SUAV that correlates with the restricted airspace boundary. The SUAV broadcasts the restricted air space beacon indicating the restricted airspace boundary relative to a current location of the SUAV. The restricted airspace boundary may comprise a region within which access by other aircraft is restricted, such as other UAVs and/or manned aircraft. In particular, other UAVs and/or manned aircraft, in an area of the public-safety incident, detect the restricted air space beacon which instructs the other UAVs and/or manned aircraft to stay outside the restricted air space boundary. Alternatively, when the incident is deemed resolved, or no longer requiring control of the air space above the incident, the SUAV beacon may be disabled and/or turned off, thereby eliminating the restricted air space designation, and the SUAV may be recalled (e.g. at the discretion of the incident air space management system, and the like). As such, congestion over the public-safety incident is controlled.

In some examples, the restricted air space beacon may be in the form of a radio-frequency (RF) radiation pattern, and the other UAVs and/or manned aircraft detect the RF radiation pattern as they approach the SUAV, for example according to a Received Signal Strength Indicator (RSSI) threshold, and the like. For example, the other UAVs and/or manned aircraft may be configured to detect, and measure, RSSI of the RF radiation pattern and compare the RSSI to an RSSI threshold; when the RSSI is below the RSSI threshold, the other UAVs and/or manned aircraft determine they are outside the restricted air space boundary, and when the RSSI is above the RSSI threshold, the other UAVs and/or manned aircraft determine they are inside the restricted air space boundary.

The restricted air space beacon may be operational in at least two incident modes: a stationary incident mode, during which the SUAV and the associated restricted airspace boundary are stationary relative to a fixed location of the public-safety incident; and a mobile incident mode, during which the SUAV and the associated restricted airspace boundary are mobile and tracking a moving incident location.

For example, the public-safety incident to which the SUAV is dispatched may include a vehicle that is initially stationary but later begins moving, or vice versa. When the vehicle is stationary, the public-safety incident is understood to have a fixed location and is designated a stationary incident, the SUAV may be stationary above the public-safety incident, and the restricted airspace boundary designated by the SUAV beacon may be proximately laterally symmetrical about the SUAV (e.g. in the shape of a three-dimensional ellipse or sphere, and the like, with the SUAV centered within the elliptical radiation pattern that is designating the restricted air space).

However, when the vehicle is moving, the public-safety incident is understood to be moving, and the SUAV may move with the public-safety incident; in these examples, the restricted airspace boundary may extend in a direction of the movement such that the restricted airspace boundary is larger in a direction-of-movement and smaller in an opposite direction to the direction-of-movement. As the SUAV moves in response to the public-safety incident changing between being stationary and/or being mobile, the restricted air space beacon and/or the incident air space management system, changes between stationary and mobile modes.

A first aspect of the present specification provides an airspace management system comprising: a signaling unmanned aerial vehicle (SUAV) associated with a public-safety entity; and a controller associated with the public-safety entity, the controller configured to: dispatch the SUAV to a location of a public-safety incident; generate a restricted airspace boundary for airspace, associated with the public-safety incident, within which the SUAV operates; and activate a restricted airspace beacon of the SUAV that correlates with the restricted airspace boundary, wherein the SUAV broadcasts the restricted airspace beacon, the restricted airspace beacon indicating the restricted airspace boundary relative to a current location of the SUAV, the restricted airspace beacon being operational in at least two incident modes: a stationary incident mode, during which the SUAV and the restricted airspace boundary are stationary relative to a fixed location of the public-safety incident; and a mobile incident mode, during which the SUAV and the restricted airspace boundary are mobile and tracking a moving incident location.

A first aspect of the present specification provides a method comprising: dispatching, via a controller associated with a public-safety entity, a signaling unmanned aerial vehicle (SUAV), associated with the public-safety entity, to a location of a public-safety incident; generating, via the controller, a restricted airspace boundary for airspace, associated with the public-safety incident, within which the SUAV operates; and activating, via the controller, a restricted airspace beacon of the SUAV that correlates with the restricted airspace boundary, wherein the SUAV broadcasts the restricted airspace beacon, the restricted airspace beacon indicating the restricted airspace boundary relative to a current location of the SUAV, the restricted airspace beacon being operational in at least two incident modes: a stationary incident mode, during which the SUAV and the restricted airspace boundary are stationary relative to a fixed location of the public-safety incident; and a mobile incident mode, during which the SUAV and the restricted airspace boundary are mobile and tracking a moving incident location.

Each of the above-mentioned aspects will be discussed in more detail below, starting with example system and device architectures of the system in which the embodiments may be practiced, followed by an illustration of processing blocks for achieving an improved technical method, device, and system for incident air space management.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. The cloud services may interface with appropriate secondary processor(s) through various interfaces, including the internet, WiFi, Ethernet, broadband cellular systems and/or networks (e.g., LTE, Long Term Evolution) systems and/or networks) and the like, wherein the cloud computing system provides application specific services which may be used independent of, or in tandem with, other computer systems and networks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Attention is directed to FIG. 1, which depicts an example system 100 for incident air space management. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like.

The system 100 comprises a signaling unmanned aerial vehicle (SUAV) 102 associated with a public-safety entity, such as a police entry, a firefighting and the like. The term "signaling", in the term SUAV, is understood to indicate that the SUAV 102 is generally configured to transmit and/or exchange signals, and the like with other components of the system 100, as described herein. As will be explained herein, the SUAV 102 generally comprises an aerial platform that transmits an active restricted air space beacon signal to publicly broadcast presence of a restricted air space designation encompassing a region proximate to the SUAV 102, along with any appropriate information associated with the restricted air space designation.

The SUAV 102 may comprise any suitable unmanned aerial vehicle and/or drone, and may comprise a camera, and/or other types of sensors (e.g. a microphone, an infrared camera, chemical detectors, and the like) that may be used to monitor an incident. It is understood that data collected by the SUAV 102 may be provide to certain other components of the system 100, such as a controller 104

The system 100 further comprises the controller 104 associated with the public-safety entity, the controller 104 generally configured to control the SUAV 102 and certain other components of the system 100, as described herein. While the controller 104 is depicted as being in a "line-of-site" (LOS) of the SUAV 102, the controller 104 may be in any suitable location, including, but not limited to, in the cloud, within a vehicle (not depicted) and/or communication device (not depicted) of a first responder 105, and/or a combination of cloud-based devices and/or communication devices local to the SUAV 102. Accordingly, the controller 104 may operate and/or control the SUAV 102 when the SUAV 102 is within visual range (e.g., line of site) of a ground operator (e.g. the first responder 105) who may be operating the controller 104. Alternatively, the controller 104 may be embedded in a cloud application, and may remotely operate the SUAV 102 when the controller 104 is "beyond-line-of-sight" (BLOS) of a ground operator; in these examples, the cloud based controller 104 may be linked to, and/or in communication with, the SUAV 102 through other wireless devices and/or networks and/or systems, which may include, but it not limited to, terrestrial cellular networks and/or systems, higher power long range broadcast networks and/or systems associated with public-safety communications (not shown in FIG. 1), and the like.

Hence, in general, the controller 104 may be provided in the form of one or more of: an "on-premises" (e.g. located at scene of an incident) direct/LOS control device that may be used to control the SUAV 102; one or more cloud-based devices that may determine a flight path of the SUAV 102 and/or direct SUAV 102 to a preplanned flight path, or a combination of both. When the controller 104 comprises an "on-premises" direct/LOS control device, the controller 104 may be used to manually control a location of the SUAV 104.

As depicted, the controller 104 has dispatched the SUAV 102 (e.g. which is understood to be air-borne) to a public-safety incident 106, interchangeably referred to hereafter as the incident 106. As depicted, the incident 106 may include a stationary vehicle 108 in which a suspect 110 is located. For example, the first responder 105 (e.g. a police officer and/or any other suitable first responder), and the like, may have pulled over the vehicle 108, recognized the suspect 110, and reported the incident 106, for example to a dispatch center 109. The dispatch center 109 may communicate with controller 104 (e.g. using a backbone communication link 111 and/or any other suitable communication link) to request the controller 104 to deploy the SUAV 102 to the incident 106. Upon arrival at the incident 106, the SUAV 102 appropriately positions itself above incident 106 in any suitable manner (e.g. above the vehicle 108) and may activate transmission of a restricted air space beacon in accordance with an appropriate policy governing a severity of risk to public-safety of the incident 106. Such policies may be maintained in the form of instructions used to generate the restricted air space beacon, and the instructions may be stored at a memory available to the dispatch center 109 and/or the controller 104. In some examples, the controller 104 may be a component (e.g. a local and/or remote component) of the dispatch center 109, or the controller 104 may operate independently from the dispatch center 109.

In some examples, the controller 104 may have dispatched the SUAV 102 to the incident 106 in response to the incident 106 being reported to the dispatch center 109.

In some examples, the controller 104 may dispatch the SUAV 102 to the incident 106 by providing instructions 112, that may include a flight path, to the SUAV 102 (e.g. via a suitable wireless communication link), to control the SUAV 102 to fly to the incident 106, and, for example, hover in a fixed location relative to the incident 106 (e.g. when the incident 106 is in a fixed location). When in transit to the incident 106, a restricted air space beacon may be disabled given there is minimal public-safety risk in areas not in proximity to incident 106; such operation may be defined by the aforementioned policies and/or instructions. Upon arrival at the incident 106, a restricted air space beacon may be enabled at the SUAV 102, as described in detail below, and a restricted air space boundary 114 may broadcast in an air space region approximately above incident 106; the size and/or shape etc. of the restricted air space boundary 114 may be defined by the instructions 112. Alternatively, the SUAV 102 may be manually controlled via the controller 104 and launched by a first responder 105, though the SUAV 102 may operate at least partially automatically/autonomous, or may operate completely autonomous dependent on the configuration of the public-safety SUAV 102. For example, hovering in a fixed location relative to the incident 106 (e.g. when the incident 106 is in a fixed location), the SUAV 102 may operate partially autonomously above the incident 106; however, when the public safety SUAV 102 is operating in a Drone as First Responder (DFR), the SUAV 102 may operate autonomously as will be described in subsequent sections of this specification.

Regardless, the SUAV 102 may collect information using any suitable on-board hardware and/or software about the incident 106 and provide such information, such as sensor data (e.g., multimedia data, aerial images and/or video of the incident 106), and provide such information to the controller 104, for example for analysis and/or to assist first responders in managing and/or responding to the incident 106.

As depicted, the controller 104 has determined a restricted airspace boundary 114 for an airspace region above the incident 106, within which the SUAV 102 operates. The restricted airspace boundary 114 is publicly broadcast by activating a restricted air space beacon 115 on-board the SUAV 102 to provide an indication of the restricted airspace boundary 114 relative to the SUAV 102. The restricted air space beacon 115 is interchangeably referred to hereafter as the beacon 115. The range and shape of the restricted air space boundary 114 is determined by signal transmission power of the beacon 115 and the radiation pattern of an antenna emitting a signal of the beacon 115 from SUAV 102. As depicted in FIG. 1, lines representing the beacon 115 are understood to indicate an RF radiation pattern and/or beacon signal being emitted from the antenna that correlates with the restricted airspace boundary 114. However, it is understood that the beacon 115 comprises RF hardware components at the SUAV 102, including, but not limited to, an RF transmitter (and/or transceiver) and an antenna, that may be activated, as described herein, to cause the depicted RF radiation pattern and/or beacon signal to be emitted; similarly, such RF hardware components may be deactivated to cause the depicted RF radiation pattern and/or beacon signal to cease being emitted.

The beacon signal may be received by a wireless communication device on an ancillary unmanned aerial vehicle (AUAV) 118, and a received Signal Strength Indicator (RSSI) of the beacon signal being above a threshold (e.g., greater than or equal to −100 dBm) at the AUAV 118, as determined at the AUAV 118, may be indicative of the AUAV 118 being within the restricted airspace boundary 114, while weaker RSSI levels are indicative of relative proximity to the restricted airspace boundary 114. Alternatively, weaker RSSI levels received at the AUAV 118 may be indicative of relative proximity to the restricted airspace boundary 114 when operating outside of restricted air space boundary 114.

In addition, a precise restrict airspace boundary coordinate may be defined using geo-fenced boundaries and stored at a registration component 113 that overlays a restricted airspace geo-fence onto a grid referencing an area map proximate to the incident 106. While the registration component 113 is depicted as being separate from the controller 104, in other examples the registration component 113 may be combined with the controller 104. In general, the registration component 113 may store coordinates and/or parameters of the restricted airspace boundary 114, which may be changed by the controller 104 as a shape of the restricted airspace boundary 114 changes. Furthermore, while certain functionality described herein is described as being implemented by the controller 104, in other examples such functionality may be implemented by the registration component 113 and/or the controller 104. For example, as coordinates and/or parameters of the restricted airspace boundary 114, change and are stored at the registration component 113, such changes may be communicated to other components of the system 100 by the registration component 113 and/or the controller 104.

The restricted airspace boundary geo-fence stored at the registration component 113 may be used by the SUAV 102 to determine the SUAV beacon antenna configuration and transmission power to generate the restricted airspace boundary 114 that correlates to the geo-fenced restricted airspace boundary stored at the registration component 113. In addition, the registration component 113 and/or the controller 104 may instruct the SUAV 102 as to when to activate the beacon 115, and a configuration for activating the beacon 115 to broadcast the restricted air space boundary 114 that correlates with the restricted airspace boundary geo-fence as stored at the registration component 113.

As depicted, the SUAV 102 broadcasts the restricted air space beacon 115 indicating the restricted airspace boundary 114 relative to a current location of the SUAV 102. Distances 117 of the restricted air space boundary 114 from the SUAV 102 may be determined by a beacon antenna radiation pattern (i.e., of the beacon 115) and a beacon transmission power (i.e., of the beacon 115) which sets the RF emission radiation pattern of the beacon 115 as dictated by electromagnetic emission principles (e.g., Maxwell's equations, RF emission pattern modeling, and the like). The restricted Air space boundary 114 may comprise any suitable three-dimensional (e.g., 3D) geometric form for air space management above the incident 106, which may correlate to a geo-fenced air space boundary as recorded at the registration component 113, including spherical shapes, 3D elliptical shapes (e.g., as depicted), asymmetrical parabolic shapes, and/or any other suitable shapes, and the like.

As will be described herein, the restricted airspace beacon 115 is generally operational in at least two incident modes.

In a stationary incident mode, as depicted in FIG. 1, the SUAV 102 and the restricted airspace boundary 114 are understood to be stationary relative to a fixed location of the incident 106. In this mode, the beacon 115 that generates the restricted air space boundary 114 may be provided in the form of an RF-radiation pattern about the SUAV 102 that defines the shape of the restricted air space boundary 114 (e.g. as depicted a 3D ellipse, with the SUAV 102 located at about a center of the 3D ellipse). In the stationary incident mode, the SUAV 102 is generally understood to hover at a fixed location above a fixed location of the incident 106, though the SUAV 102 may be repositioned to other fixed locations, with the restricted air space boundary 114 being repositioned accordingly, for example such that the RF-radiation pattern is always emitted relative to the SUAV 102 and/or the SUAV 102 is always located at about a center of the restricted air space boundary 114 (e.g. the beacon 115 that sets the restricted air space boundary 114 is located on the SUAV 102 and is configured such that the SUAV 102 is always located at about a center of an elliptical RF-radiation pattern, and the like). As described below, however, in other examples, in the stationary mode, the restricted air space beacon 115 of the SUAV 102 may be configured to produce a non-symmetrical restricted air space boundary 114, such as an asymmetric 3D geometric shapes and/or any suitable shape as recorded at the registration component 113, and the like.

In a mobile incident mode, the SUAV 102 and the restricted airspace boundary 114 are understood to be mobile, and the SUAV 102 and/or the controller 104, and the like, may be tracking a moving incident location. For example, the vehicle 108 may start to move, and the SUAV 102 may be instructed, by the controller 104, to follow the vehicle 108. In this mode, the beacon 115, located on the SUAV 102, that generates the RF radiation pattern designating the restricted airspace boundary 114 may be adjusted by the controller 104 to steer the RF radiation pattern in a selected direction-of-interest, for example in a forward direction-of-movement of the SUAV 102, as described herein with respect to FIG. 4.

The restricted airspace beacon 115 of the SUAV 102 may further include a broadcast of an identifier signal, either independent of or embedded within the RF radiation pattern of the restricted air space beacon 115, and other aircraft that detect the restricted airspace boundary 114 may also receive the identifier information.

As depicted, the system 100 further comprises a manned aircraft 116 (alternatively referred to as the aircraft 116) and the aforementioned AUAV 118.

For example, the manned aircraft 116 may be piloted by a person/human; while the manned aircraft 116 is depicted in the form of a helicopter, the manned aircraft 116 may have any suitable format. In some examples, the manned aircraft 116 may be associated with the public-safety entity of the SUAV 102 and the controller 104. In other examples the manned aircraft 116 may be associated with another entity, such as a media entity, and the manned aircraft 116 may have been dispatched by such an entity to "cover" the incident 106. In yet further examples, the manned aircraft 116 may comprise a private aircraft, or an aircraft operated by a business, that (e.g., randomly) happens to be in a region of the incident 106.

Similarly, the AUAV 118 may comprise a UAV associated with another entity, such as a media entity, and the AUAV 118 may have been dispatched by such an entity to "cover" the incident 106. The AUAV 118 is referred to as an "ancillary" as the AUAV 118 may be utilized as being ancillary to the SUAV 102, as described herein with respect to FIG. 6 and FIG. 7.

In general, the restricted airspace beacon 115 on the SUAV 102 that correlates with the restricted airspace boundary 114 (e.g. frequencies and/or identifiers thereof) and/or may be registered with an entity that regulates airspace, such as the Federal Aviation Administration (FAA) in the Unites States, Transport Canada in Canada, the European Union Aviation Safety Agency (EASA) in Europe, amongst other possibilities. As such, radio components of the manned aircraft 116 and the AUAV 118 may be generally configured to detect beacons registered with such agencies, and may hence be generally configured to detect the restricted airspace beacon 115 of the SUAV 102. For example, aircraft 116 and/or AUAV 118 may be configured to detect the transmission frequencies of the RF-radiation pattern of the restricted airspace beacon 115 and/or an identifier broadcast in the restricted airspace beacon 115.

The manned aircraft 116 and the AUAV 118 may determine the RF-radiation power of the restricted airspace beacon transmission, for example in the form of RSSI, and compare the measured RSSI with a threshold RSSI. For example, the restricted air space boundary 114 may correspond to a distance from SUAV 102 that produces an RSSI value of −100 dBm as measured by an RSSI detector (not shown). When the measured RSSI is below the RSSI threshold (e.g.: less than −100 dbm), the manned aircraft 116 and the AUAV 118 are sufficiently distant from SUAV 102 so as to indicate that they are outside the restricted air space boundary 114; however, detecting the restricted air space beacon 115 at any power level is indicative of the aircraft 116 and/or the AUAV 118 being sufficiently close to the restricted air space region associated with incident 106 so as to warranted heightened precautions. When the measured RSSI is above the RSSI threshold (e.g.: greater than or equal to −100 dBm), the manned aircraft 116 and the AUAV 118 distance to SUAV 102 is sufficiently small so as to indicate that they are inside the restricted air space boundary 114. Hence, the manned aircraft 116 and the AUAV 118 may be generally configured to measure the RSSI of the restricted air space beacon 115 broadcast by the SUAV 102 and maneuver such that the measured RSSI of the restricted air space beacon 115 is always below the threshold RSSI indicating the restricted air space boundary 114.

As such, it is understood that the dashed line representing the restricted air space boundary 114 in FIG. 1 represents a 3-dimensional volume that encompasses the air space regions where the RSSI of the RF-radiation pattern of the restricted air space beacon 115, is greater than, or equal to the threshold RSSI (e.g., as distances 117 from SUAV 102 decrease, the measured RSSI value increases; as the distances 117 increase, the measured RSSI value decreases). The restricted air space boundary 114 may be expanded by increasing the broadcast power of the restricted air space beacon 115 such that the distances 117 from the SUAV 102 to a given measured RSSI (e.g.: −100 dBm) is increased, thus causing the measured RSSI to exceed the threshold RSSI at larger distances from the SUAV 102. Conversely, the restricted air space boundary 114 may be reduced by decreasing the broadcast power of the restricted air space beacon 115 *f* the SUAV 102, thereby reducing distances 117 from the SUAV 102 to a given measured RSSI (e.g.: −100 dBm) such that regions where the measured RSSI of the restricted air space beacon 115 indicating a restricted air space is smaller than the depicted regions.

Consequently, for a given threshold RSSI power level (e.g., −100 dBm) indicating the restricted air space boundary 114, the distances 117 from the SUAV 102 are directly proportional to power, while the shape of the restricted air space volume contour represented by the dashed lines indicating the restricted air space boundary 114 may be modified by the antenna radiation pattern of the restricted air space beacon 115.

Such a threshold RSSI may be preset and/or preconfigured at the manned aircraft 116 and the AUAV 118 and/or such a threshold RSSI may be broadcast and/or encoded into the restricted air space beacon 115 that defines the air space boundary 114. In some examples, a size of the restricted air space as indicated by the distances 117 in FIG. 1, may be indicated by changing the threshold RSSI itself, without changing broadcast power of the restricted air space beacon 115. Accordingly, the threshold RSSI preset at the aircraft 116 and/or the AUAV 118 and/or encoded in the restricted air space beacon 115 may become a variable determinate of a range of the restricted air space boundary 114; for example, the restricted air space boundary 114 may be expanded by reducing the power value of the threshold RSSI, or alternatively the restricted air space boundary 114 may be contracted by increasing the power value of the threshold RSSI.

Similarly, a shape of the restricted airspace beacon 115 may be adjusted via operating frequencies and/or antenna configurations of the beacon transceiver and/or transmitter of the SUAV 102. Indeed, a size and/or shape of a contour of the restricted air space boundary 114 may be controlled via one or more of power and/or value for the threshold RSSI, and/or operating frequencies and/or antenna configurations of a transceiver and/or transmitter of the SUAV 102. For example, an antenna of the SUAV 102 used to broadcast the restricted air space boundary 114 may comprise a plurality of directional antennas or a phased array antenna matrix.

The controller 104 may determine a size of the restricted air space boundary based, for example, on an incident type of the incident 106. For example, while the incident 106 is depicted as including a single vehicle 108 at a single location, the incident 106 may include multiple vehicles spread out over a larger area (e.g. a large traffic accident). As such, a size of the restricted air space boundary 114 may be changed based on an incident type, and the controller 104 may communicate to the SUAV 102 the beacon parameters (e.g., power, antenna configuration, frequency of operation, etc.) that sets the size of the restricted air space boundary 114 so as to correlate to (e.g., match) the geo-fenced restricted airspace shape recorded at the registration component 113, and the like. In particular, the shape and range of the restricted airspace geo-fence telemetry may be used to determine appropriate parameters for the beacon 115 of the SUAV 102. Other functionality of the system 100 is described below with respect to FIG. 4, FIG. 5, FIG. 6 and FIG. 7. However, such functionality may include, but is not limited to, the controller 104 communicating with the manned aircraft 116 and/or the AUAV 118; as such respective wireless communication links therebetween are depicted using double arrow dashed lines.

Figure 2:
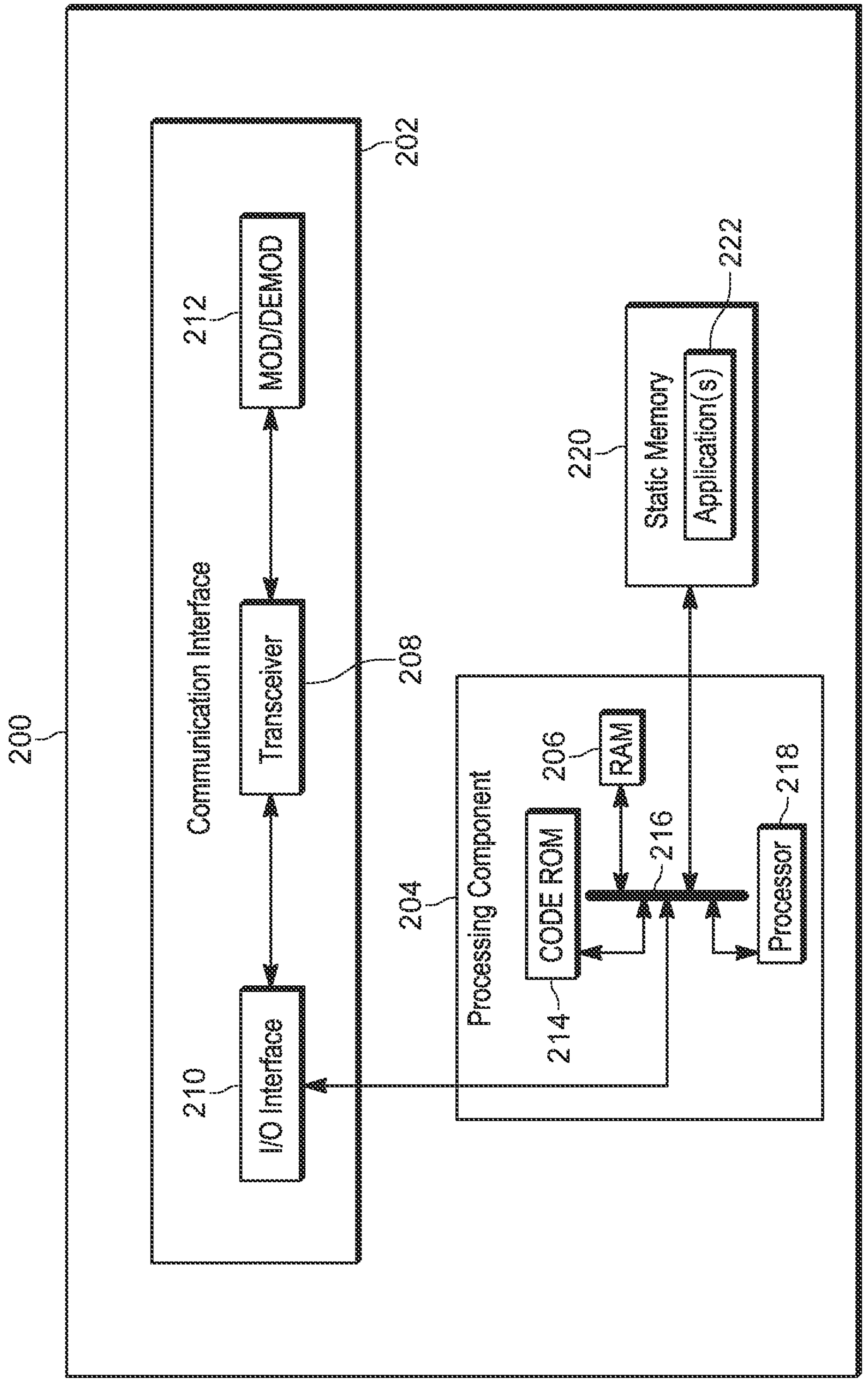
FIG. 2 is a device diagram showing a device structure of a communication device for incident air space management, in accordance with some examples.

Attention is next directed to FIG. 2, which depicts a schematic block diagram of an example of a device 200 that may embody the SUAV 102 or the controller 104. While the device 200 is depicted in FIG. 2 as a single component, when the device 200 embodies the controller 104, functionality of the device 200 may be distributed among a plurality of components, such as a plurality of servers and/or cloud computing devices, and/or a control device that may be located at a scene of an incident. However, when the device 200 embodies the SUAV 102, the device 200 may be provided as a single component.

As depicted, the device 200 comprises: a communication interface 202, a processing component 204, a Random-Access Memory (RAM) 206, one or more wireless transceivers 208, one or more wired and/or wireless input/output (I/O) interfaces 210, a combined modulator/demodulator 212, a code Read Only Memory (ROM) 214, a common data and address bus 216, a processor 218, and a static memory 220 storing at least one application 222. The processor 218 is understood to be communicatively connected to other components of the device 200 via the common data and address bus 216. Hereafter, the at least one application 222 will be interchangeably referred to as the application 222.

Furthermore, while the memories 206, 214 are depicted as having a particular structure and/or configuration, (e.g., separate RAM 206 and ROM 214), memory of the device 200 may have any suitable structure and/or configuration.

While not depicted, the device 200 may include one or more of an input component and/or a display screen, which, when present, may be communicatively coupled to the processor 218.

As shown in FIG. 2, the device 200 includes the communication interface 202 communicatively coupled to the common data and address bus 216 of the processing component 204.

The processing component 204 may include the code Read Only Memory (ROM) 214 coupled to the common data and address bus 216 for storing data for initializing system components. The processing component 204 may further include the processor 218 coupled, by the common data and address bus 216, to the Random-Access Memory 206 and the static memory 220.

The communication interface 202 may include one or more wired and/or wireless input/output (I/O) interfaces 210 that are configurable to communicate with other components of the system 100. For example, the communication interface 202 may include one or more wired and/or wireless transceivers 208 for communicating with other suitable components of the system 100. In addition, the communication interface 202 may be connected to one or more antennas (not shown) and such antennas may be configured to implement the functions and RF radiation pattern characteristics of the beacon 115, as described herein. Put another way, it is understood that when the device 200 embodies the SUAV 102, the communication interface 202, and/or RF hardware components thereof, may comprise the beacon 115.

In particular, when the device 200 embodies the SUAV 102, the communication interface 202 is configured to wirelessly communicate with the controller 104. However, when the device 200 embodies the controller 104, the communication interface 202 is configured to wirelessly communicate with the SUAV 102, and may further wirelessly communicate with the manned aircraft 116 and/or the AUAV 118; in these examples, the communication interface 202 may communicate using wired interfaces with other devices 200, and/or any other suitable components of the system 100.

Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3rd Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

When the device 200 embodies the controller 104, the communication interface 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

Furthermore, when the device 200 embodies the SUAV 102, the communication interface 202 may be further implemented to enable broadcast the restricted air space beacon 115 located at the SUAV 102 to generate restricted air space boundary 114, and may adaptively configure the restricted air space beacon parameters that may include, but is not limited to, parameters for controlling RF components (e.g. such as one or more of the transceivers 208 and/or a dedicated transmitter) to broadcast the restricted air space beacon 115 at powers and/or strengths and/or operating frequencies and/or antenna configurations that correlate to the restricted air space boundary 114 (e.g. as recorded at the registration component 113). With regards to antenna configuration, the communication interface 202 may include a directional antenna, and the like, which may be controlled according to an antenna configuration that correlates to the restricted air space boundary 114; for example different sectors of the directional antenna may be controlled to energize (e.g., apply RF energy) to control a shape of an RF radiation pattern of the restricted air space beacon 115 to control a shape of the restricted air space boundary 114.

The processor 218 may include ports (e.g., hardware ports) for coupling to other suitable hardware components of the system 100.

The processor 218 may include one or more logic circuits, one or more processors, one or more microprocessors, one or more GPUs (Graphics Processing Units), and/or the processor 218 may include one or more ASIC (application-specific integrated circuits) and one or more FPGA (field-programmable gate arrays), and/or another electronic device. In some examples, the processor 218 and/or the device 200 is not a generic processor and/or a generic device, but a device specifically configured to implement functionality for incident air space management. For example, in some examples, the device 200 and/or the processor 218 specifically comprises a computer executable engine configured to implement functionality for incident air space management.

The static memory 220 comprises a non-transitory machine readable medium that stores machine readable instructions to implement one or more programs or applications. Example machine readable media include a non-volatile storage component (e.g., Erasable Electronic Programmable Read Only Memory ("EEPROM"), Flash Memory) and/or a volatile storage component (e.g., random-access memory ("RAM")). In the example of FIG. 2, programming instructions (e.g., machine readable instructions) that implement the functionality of the device 200 as described herein are maintained, persistently, at the memory 220 and used by the processor 218, which makes appropriate utilization of volatile storage during the execution of such programming instructions.

Figure 3:
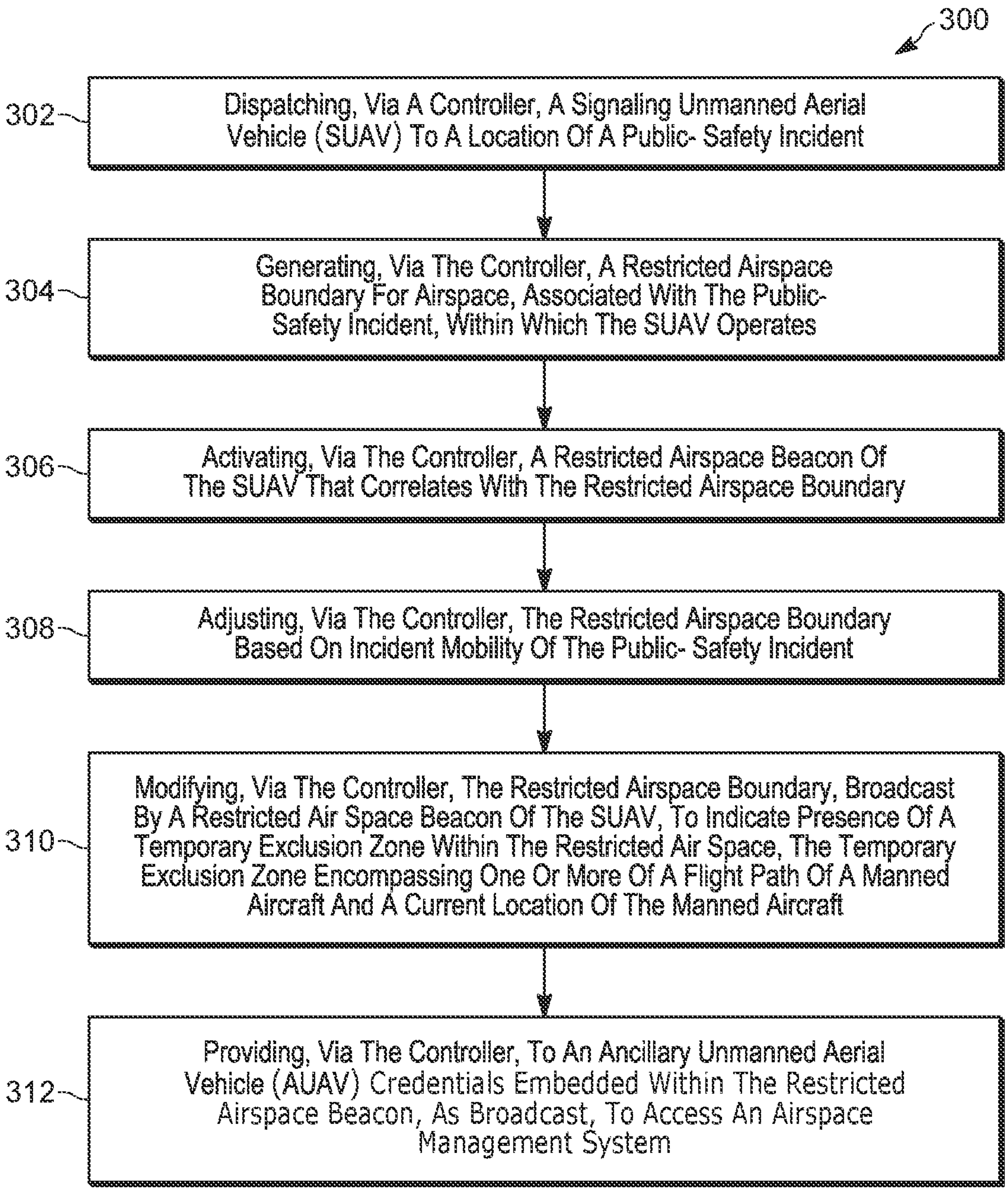
FIG. 3 is a flowchart of a method for incident air space management, in accordance with some examples.

Furthermore, when the device 200 embodies the controller 104, the memory 220 stores instructions corresponding to the at least one application 222 that, when executed by the processor 218, enables the processor 218 to implement functionality for incident air space management, including but not limited to, the blocks of the method set forth in FIG. 3.

Attention is now directed to FIG. 3, which depicts a flowchart representative of a method 300 for incident air space management. The operations of the method 300 of FIG. 3 correspond to machine readable instructions that are executed by the controller 104, and specifically the processor 218 of the controller 104. In the illustrated example, the instructions represented by the blocks of FIG. 3 are stored at the memory 220 for example, as the application 222. The method 300 of FIG. 3 is one way that the processor 218 and/or the controller 104 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 104 dispatches the SUAV 102 to a location of the public-safety incident 106. At block 302, the restricted air space beacon 115 may not be active when the SUAV 102 is in route to incident 106. As previously described, the SUAV 102 may be piloted by manual control via line-of-sight (LOS) observation, or autonomously piloted beyond the LOS as per preprogrammed flight path instructions communicated by the controller 104 to SUAV 102.

For example, the controller 104 may wirelessly provide the instructions 112 to the SUAV 102 that indicate a flight path of the SUAV 102 to the location of the incident 106. Such instructions 112 may include any suitable combination of flight path data including, but not limited to any suitable combination of at least one direction vector, processor 218 elevation, processor 218 flight velocity, a hover location (e.g. a location above the incident 106 at which location the SUAV 102 is to remain stationary), and the like. The SUAV 102 is understood to receive such instructions 112 and travel to the location of the incident 106. In some examples, the instructions 112 may be provided in consideration of restricted air space boundary vectors, which may be registered at the registration component 113, so as to establish the restricted air space boundary 114 (e.g. the controller 104 and/or the registration component 113 may provide to the SUAV 102 a location proximate to incident 106 best suited for the creation of the restricted airspace boundary 114 prior to the SUAV 102 being dispatched, the location registered at the registration component 113).

At a block 304, the controller 104 generates a restricted airspace boundary for airspace, associated with the public-safety incident 106, within which the SUAV 102 operates.

In some examples, the controller 104 generates the restricted airspace boundary in the form of geofence coordinates (e.g. using Global Positioning System (GPS) coordinates that may be referenced to a metropolitan area map designating streets, landmarks, and the like) which may be registered at the registration component 113, and/or using any other suitable designation of a "flight path keep out zone". Put another way, the restricted airspace boundary 114 may generally indicate a zone within which flight paths of aircraft, other than the SUAV 102, are restricted and/or excluded.

A size and/or shape of the restricted airspace boundary 114 (e.g. and/or a representative geofence designation which may be registered at the registration component 113) may be determined by a location and/or an area of the incident 106, with larger incident areas resulting in a larger volume of the restricted airspace boundary 114 by extending the distances 117. In some examples, certain types of incidents that are designated as minor incidents for example, may (e.g. minor incidents) be associated with smaller incident areas that may result in a smaller volume of the restricted airspace boundary 114 by reducing the distances 117.

At a block 306, the controller 104 activates the restricted airspace beacon 115 of the SUAV 102 that correlates (e.g.: generates) with the restricted airspace boundary.

For example, the controller 104 may activate (e.g. via the instructions 112) the restricted airspace beacon 115 of the SUAV 102 that generates the restricted airspace boundary 114 so as to correlate to the geo-fenced restricted air space coordinates registered at the registration component 113.

However, the activation may occur in any suitable manner by way of the controller 104 communicating to the SUAV 102 restricted air space beacon parameters (such as RF power, antenna configuration, frequency of operation, and the like) that when applied to the restricted air space beacon 115 will cause the restricted air space beacon 115 to generate the appropriate restricted airspace boundary 114.

In some examples, the controller 104 may convert the restricted airspace boundary geofence coordinates registered at the registration component 113 into the instructions 112 related to configuring the restricted air space beacon 115, that are communicated to the SUAV 102; the instructions 112 may include parameters for setting a beacon power and/or shape of an RF radiation pattern so that when the SUAV 102 implements the instructions 112, the beacon 115 generates the desired profile for restricted airspace boundary 114.

Alternatively, the SUAV 102 may activate the restricted air space beacon 115 as previously configured with default RF power and antenna configurations that generates a restricted airspace boundary 114, and the like. In some of these examples, default beacon parameters may be communicated to the controller 104 by the SUAV 102 and the controller 104 may subsequently convert the default parameters into geofence coordinates that are then registered at the registration component 113.

In response to receiving the beacon parameters, the SUAV 102 may responsively implement, at the beacon 115, the beacon parameters to generate the restricted airspace boundary 114, for example by generating an RF radiation pattern that is correlated to a size and/or shape of the desired restricted airspace boundary coordinates as registered at the registration component 113. For example, a transceiver and/or RF emitter comprising the restricted air space beacon 115 on the SUAV 102 may be controlled according to power, and/or operating frequency and/or antenna configuration such that when used to operate the beacon 115, such a combination of parameters results in a given size and/or given shape of the restricted airspace boundary 114.

In this manner, it may be understood that the SUAV 102 broadcasts the restricted airspace beacon 115 that generates the restricted air space boundary 114, the restricted airspace boundary 114 indicating the restricted airspace relative to a current location of the SUAV 102. Furthermore, the restricted airspace beacon 115 of the SUAV 102 is understood to be operational in at least two incident modes: a stationary incident mode, during which the SUAV 102 and the restricted airspace boundary are stationary relative to a fixed location of the public-safety incident 106; and a mobile incident mode, during which the SUAV 102 and the restricted airspace boundary are mobile and tracking a moving incident location and/or a moving location of the public-safety incident 106. However, the SUAV 102 may operate according to other modes, such a mode where the restricted airspace boundary 114 is not broadcast when the beacon is deactivated.

At a block 308, the controller 104 may adjust the restricted airspace boundary 114 based on incident mobility of the public-safety incident 106. For example, when the vehicle 108 begins to move, the controller 104 may change the SUAV 102 from the stationary incident mode to the mobile incident mode via a mode change indicator that may also be registered at the controller 104. Such a mode change indicator may instruct the SUAV 102 of a flight path region to be used to follow the vehicle 108 and/or such an indication may instruct the SUAV 102 to alter, and/or modify, a size and/or shape of restricted airspace boundary 114, for example to extend the restricted air space beacon radiation pattern in the direction-of-movement of the SUAV 102 and/or in a direction-of-interest relative to the position of SUAV 102.

Alternatively, the SUAV 102 may receive instructions to move in a particular direction (e.g. to follow the vehicle 108) and dynamically adjust the restricted airspace beacon parameters effecting the restricted airspace boundary 114 accordingly.

Flight control of the SUAV 102 to follow the vehicle 108, and/or to move, may alternatively occur via real-time manual control of the SUAV 102 using the controller 104, or alternatively via auto-piloted control of the SUAV 102 using preprogrammed flight path coordinates previously communicated to the SUAV 102 by controller 104.

Similarly, when the SUAV 102 is moving to follow the vehicle 108, when the SUAV 102 stops, for example because the vehicle 108 has stopped, the controller 104 may change the SUAV 102 from the mobile incident mode to the stationary incident mode via a mode change indicator that is similarly registered at the controller 104.

Regardless, the restricted airspace boundary 114, as indicated by the beacon 115 of the SUAV 102, as well as the geo-fenced restricted air space boundary coordinates (e.g. as stored at the controller 104) may each be dynamically adjusted in response to changes in an incident mode in any given order, with the restricted airspace beacon parameters being updated in response to the incident mode change either before or after the restricted airspace boundary geofence is changed in response to the same incident mode change; the restricted airspace boundary 114, as updated, is broadcast by the SUAV 102.

As has been previously described, an RF radiation pattern of the beacon 115, that affects the restricted airspace boundary 114, may be modified according to the SUAV 102 being in the stationary incident mode or the mobile incident mode.

For example, during the stationary incident mode, the transmitted RF radiation pattern of the beacon 115, that generates the restricted airspace boundary 114, may be approximately centered around the SUAV 102 and may be symmetrical about the SUAV 102, as depicted in FIG. 1, and may assume any appropriate 3D volumetric shape which may be correlated to a RF radiation pattern, including elliptical, spherical, toroidal, and/or in any other suitable shape.

However, during the mobile incident mode, the RF radiation pattern that generates the restricted airspace boundary 114 may be further adjusted by the controller 104 and/or the SUAV 102 to modify the RF radiation pattern (e.g. via a directional antenna) in such a way so as to "steer" a shape and/or direction of the restricted air space boundary 114 in a selected direction-of-interest. For example, a first lobe of the RF radiation pattern may extend in a direction-of-movement of the SUAV 102, and a second lobe of the radiation may extend away from the direction-of-movement of the SUAV 102, with the first lobe being longer than the second lobe.

For example, while a direction-of-interest may include the direction-of-movement of the SUAV 102, the direction-of-interest may be selected based on other factors. For example, changes in the direction-of-interest may occur in response to changes in parameters associated with the incident 106, as determined by the SUAV 102 and/or the controller 104, including, but not limited to, changes to the aforementioned direction-of-movement of the SUAV 102 (e.g. the RF radiation pattern may be steered along changed direction-of-movement of the SUAV 102), presence or absence of buildings along a flight path of the SUAV 102 (e.g. the RF radiation pattern may be steered away from buildings), a projected flight path of the SUAV 102 prior to a change in direction, and the like (e.g. the RF radiation pattern may be steered towards a projected flight path of the SUAV 102). Once a change in one or more parameters associated with the incident 106 occurs (e.g. the moving vehicle 108 may turn a corner and the SUAV 102 may follow), the controller 104 may determine a direction-of-interest and/or an updated direction-of-interest, and communicate with the SUAV 102 to modify the beacon parameters so as to update the restricted airspace boundary 114 accordingly (e.g. by changing one or more of RF power, RF frequency, antenna configuration, and the like), where the RF radiation pattern that determines the restricted airspace boundary 114 is adjusted toward the direction-of-interest.

In some examples, the controller 104 may be further configured to: modify the restricted airspace boundary 114 based on one or more incident types of the public-safety incident 106; and adjust the restricted airspace beacon 115 of the SUAV 102 to correlate with the restricted airspace boundary as modified.

For example, an incident type may designate a single vehicle crash that may result in a restricted airspace boundary that is smaller than an incident type of a multivehicle accident; similarly, an incident type of a multivehicle accident may result in a restricted airspace boundary that is smaller than an incident type of a bridge collapse, and the like. The controller 104 may have access to a database (not shown) of predetermined parameter sets (e.g.: each parameter set includes a RF power setting, antenna configuration, RF operating frequency, and the like) where a parameter set will produce a different range and shape of a restricted air space boundary 114 when programmed into the restricted air space beacon 115 at the SUAV 102. Each parameter set may be selected to produce different sizes and/or shapes of the restricted airspace boundary 114, correlated with incident types. In addition, controller 104 may have access to, and/or may receive, an incident report, and the like, indicating a type of the incident 106, and may select a restricted airspace boundary 114 based on incident type from the database of predetermined parameter sets.

Alternatively, the controller 104 may have access to multimedia data (e.g. images, video, and/or other sensor data), from the SUAV 102 that show a size and/or shape of the incident 106, which may enable the controller 104 to determine a size and/or shape of the restricted airspace boundary and instruct the SUAV 102 accordingly.

However such determinations may alternatively occur at the SUAV 102. Put another way, such determinations may occur at the controller 104, the SUAV 102 and/or any other suitable computational resource which may include, but is not limited to computational resources associated with the dispatch center 109, cloud-based computational resources, and the like, and/or any other computational resource associated with the system 100.

During the stationary incident mode, the RF radiation pattern generating the restricted airspace boundary 114, as broadcast by the restricted air space beacon 115 at SUAV 102, may be further adjusted by the controller 104 and/or the SUAV 102 based on an area of interest within an incident type.

In particular, in some examples, a shape of the RF radiation pattern of the restricted airspace beacon 115 may be skewed such that the restricted airspace boundary 114 extends over certain objects and/or assets on the ground (e.g. any vehicles and/or objects and/or persons associated with an incident, and/or first responders and/or first responder vehicles located at the incident) to restrict airspace over such objects/assets, when the SUAV 102 is in the stationary incident mode. In a particular example, with respect to FIG. 1, the RF radiation pattern of the beacon 115 may be changed such that the restricted airspace boundary 114 extends further out in front of the vehicle 108 as compared to the rear of the vehicle 108.

Furthermore, over time, a size of an incident, and/or a type of an incident may change, and the size and/or shape of the restricted airspace boundary 114 may be adjusted accordingly. For example, a multiple vehicle crash may change to a single vehicle crash as vehicles are removed from the incident 106 so that a size and/or shape of the restricted airspace boundary 114 may be adjusted accordingly, for example to reduce or expand, and/or to skew and/or elongate in a direction-of-interest and/or to cover certain objects/assets (e.g. using a directional antenna).

At a block 310, the controller 104 modifies the restricted airspace boundary 114, broadcast by the restricted airspace beacon 115 of the SUAV 102 to indicate a presence of a temporary exclusion zone within the restricted airspace boundary, the temporary exclusion zone encompassing one or more of a flight path of the manned aircraft 116 and a current location of the manned aircraft 116.

For example, the controller 104 may be further configured to:

Determine a flight path of the manned aircraft 116 approaching the location of the public-safety incident 106. The flight path of the manned aircraft 116 may be determined via one or more of: data received from the manned aircraft 116; a "published" flight path of the manned aircraft 116 (e.g. made available to the controller 104 from a cloud device at which flight paths of manned aircraft are published and/or stored); images and/or video of the manned aircraft 116, for example as received from the SUAV 102. In a particular example, an identifier of the manned aircraft 116 may be determined (e.g. as broadcast by the manned aircraft 116 and/or an identifier of the manned aircraft 116 may be painted and/or stenciled, and the like, on the manned aircraft 116 and acquired in images thereof), and the identifier may be used to "look-up" the "published" flight path of the manned aircraft 116

Determine a temporary exclusion zone within the restricted airspace boundary 114, the temporary exclusion zone encompassing one or more of the flight path of the manned aircraft 116 and a current location of the manned aircraft 116. For example, the temporary exclusion zone may comprise an air space region that encompasses an area proximate to a projected flight path and/or published flight path and/or current location of the manned aircraft 116, where other aircraft may not enter said exclusion zone, including, but not limited to, the SUAV 102 and the AUAV 118. The temporary exclusion zone may be fixed in space even if the SUAV 102, and hence the restricted airspace boundary 114, moves. Furthermore, while at least a portion of the temporary exclusion zone is understood to be inside the restricted airspace boundary, other portion(s) of the temporary exclusion zone may be outside the restricted airspace boundary 114.

Modify the restricted airspace boundary 114, broadcast by the restricted airspace beacon 115 of the SUAV 102, to indicate a presence of the temporary exclusion zone within the restricted airspace boundary. For example, the controller 104 may provide geofence coordinates, that correspond to the temporary exclusion zone, to the SUAV 102, and SUAV 102 may encode such coordinates as data into the restricted airspace beacon 115, such that other aircraft may receive the coordinates and stay out of the temporary exclusion zone. Alternatively, the temporary exclusion zone may be registered at the registration component 113 and operators of other aircraft may access the temporary exclusion zone within restricted air space boundary 114 at the registration component 113 (e.g. using suitable communication devices) to determine the geofence coordinates for the designated exclusion zone and adjust their flight paths to avoid the zone. Similarly, the SUAV 102 generally stays out of the temporary exclusion zone. In this manner, the manned aircraft 116 may fly through the restricted airspace boundary with a reduced danger of encountering other aircraft. As such, police helicopters, and the like, may fly through the restricted airspace boundary.

When the manned aircraft 116 leaves the temporary exclusion zone within the restricted air space boundary 114, the exclusion zone geofence is removed within the restricted air space boundary 114 (e.g. and from the registration component 113), and the RF broadcast transmission from the restricted airspace beacon on the SUAV 102 is adapted to indicate removal of the temporary exclusion zone within the restricted air space boundary 114. For example, the encoded coordinates delineating the temporary exclusion zone may be removed from the restricted airspace beacon 115.

In particular, the controller 104 may control the SUAV 102 to stay out of the temporary exclusion zone until the manned aircraft 116 leaves the temporary exclusion zone within the restricted airspace boundary 114.

At a block 312, the controller 104 provides, to the AUAV 118, credentials embedded within the restricted airspace beacon, as broadcast, to access the airspace management system 100 and in particular access information from the controller 104 and/or the SUAV 102.

For example, the AUAV 118 may be registered with the controller 104 (e.g. an entity that operates the AUAV 118 may register an identifier of the AUAV 118 with the controller 104), and the controller 104 may provide credentials that enable the AUAV 118 to access the controller 104 and/or information from a camera and/or sensors of the SUAV 102 under certain conditions.

For example, if an operator of the AUAV 118 requests access to the restricted air space within the restricted airspace boundary 114, the controller 104 may provide the credentials to the SUAV 102, and the SUAV 102 may encode the credentials in the restricted airspace beacon 115 transmission. The AUAV 118 may receive the credentials in the restricted airspace beacon 115 and use the credentials to communicate with the controller 104 and/or the SUAV 102, for example via any suitable wireless links between the AUAV 118 and the controller 104 and/or the SUAV 102. Such credentials may comprise log-in credentials and/or a Uniform Resource Locator (URL) for the controller 104 and/or the SUAV 102 that enables the AUAV 118 to access information from the controller 104 and/or the SUAV 102. Such credentials may further be encrypted using any suitable scheme, such that the AUAV 118 may access the credential only when the AUAV 118 has a suitable decryption key, which may be provided to the AUAV 118 when the AUAV 118 registers with the controller 104.

Alternatively, and/or in addition, the credentials may further enable the AUAV 118 to access the restricted airspace boundary.

Hence, in some examples, the AUAV 118 may be configured to:

Access the controller 104 using the credentials, as received (e.g. in transmission of RF radiation of the restricted airspace beacon 115), to request access to the restricted airspace boundary 114, for example by communicating with the controller 104 using the credentials via a wireless communication link there between.

Receive, from the controller 104, permissions (e.g. and optionally with control contingencies) that designate flight path authorizations within the restricted airspace boundary 114. For example, the permissions may include geofence coordinates (e.g. and/or GPS coordinates) within the restricted airspace boundary, and within which the AUAV 118 is permitted to fly. The optional control contingencies may indicate restrictions regarding what actions the AUAV 118 may be permitted to perform within the restricted airspace boundary 114. For example, the AUAV 118 may be permitted to acquire images, but not video, and/or the AUAV 118 may be permitted to acquire images and/or video but only in certain directions (e.g. that may exclude any first responders and/or first responder vehicles at the scene of the incident 106). The optional control contingencies may alternatively, and/or in addition, indicate a time period during which access to the restricted airspace boundary is granted, after which the AUAV 118 must leave the area within the restricted airspace boundary 114. However, any suitable control contingencies are within the scope of the present specification.

Accordingly, the controller 104 may be further configured to:

Identify a type of the AUAV 118 operating in proximity to the public-safety incident 106. For example, the AUAV 118 may broadcast its identifier which is registered with the controller 104, and the controller 104 may determine a type of the AUAV 118 accordingly. For example, a type and/or classification of the AUAV 118 may comprise a media AUAV operated by a media entity and/or a determined type of the AUAV 118 may indicate available functionality of the AUAV 118, such as what cameras, and/or other sensors, are available at the AUAV 118.

Grant temporary access of the AUAV 118 to a localized flight lane within the restricted airspace boundary 114, the localized flight lane defining a path within the restricted airspace boundary within which the AUAV 118 may operate. For example, the localized flight lane may include geofence coordinates within the restricted airspace boundary (e.g. which may be stored at the aforementioned registration component 113 which stores parameters of the restricted airspace boundary 114), within which the AUAV 118 is permitted to fly.

Communicate the localized flight lane to the AUAV 118 via one or more of: peer-to-peer communications between the SUAV 102 and AUAV 118; and AUAV communication directly to the controller 104 of the airspace management system 100. For example, when peer-to-peer (e.g., P2P) communications between the SUAV 102 and AUAV 118 are used, the controller 104 may communicate the localized flight lane to the SUAV 102, and the SUAV 102 may communicate the localized flight lane to the AUAV 118. Alternatively, and/or in addition, the controller 104 may communicate the localized flight lane to the AUAV 118 directly using a wireless communication link between the controller 104 and the AUAV 118. In addition, the AUAV 118 may communicate to a cloud based command-and-control application of system 100 (not shown) through an alternative RF wireless link (e.g., a terrestrial based cellular link) to the controller 104 (e.g. and/or the aforementioned component which stores parameters of the restricted airspace boundary 114), such that the geo-fenced coordinates of the flight path of the AUAV 118 may be registered and subsequently communicated in response to access approval back to the AUAV 118 through the alternative RF wireless link, directly from controller 104, and/or through a P2P link with the SUAV 102 as previously described. Furthermore, the localized flight lane may comprise the aforementioned designated flight path authorizations provided to the AUAV 118.

Returning to the aforementioned credentials that may be provided to the AUAV 118, it is understood that the SUAV 102 may be generally configured as a drone as first responder (DFR) and the AUAV 118 may be generally configured as a telepresence line of sight (TLOS) UAV, and the credentials granted by the controller 104 may allow the AUAV 118 to temporarily operate as a DFR within the restricted airspace boundary.

Put another way, the AUAV 118 may be granted access to the restricted airspace boundary 114 (e.g. in addition to being granted access to information available via the controller 104 and/or the SUAV 102), in exchange for allowing the controller 104 access to information acquired by the AUAV 118, such as images and/or video and the like, and/or in exchange for allowing the controller 104 to temporarily operate the AUAV 118 as a DFR within the restricted airspace boundary. In some examples, the controller 104 may specifically instruct the AUAV 118 as to where and when (and how long) to fly within the restricted airspace boundary 114, for example within the localized flight lane.

Furthermore, such access may be granted to the AUAV 118, when the type of the AUAV 118 meets certain conditions, that may be designated by type, such as the AUAV 118 having a camera on board.

For clarity, it is understood that a "Drone as a First Responder" (DFR) may include any suitable public-safety UAVs that are integrated into a public-safety agency's daily workflows, for example to facilitate local and/or remote live streaming, for example to collect evidence for public-safety incidents.

For further clarity it is understood that Line of Sight (LOS) operation of a public-safety UAV may include a UAV that is launched by a local "pilot" and manually controlled via an on-site, local controller having Line-of-Sight (LOS) observation of the UAV being controlled. In another example, a public-safety drone may be manually deployed as previously described, and initially controlled by a local ground based controller, and subsequently the control of the public-safety UAV may be "handed-off" to a cloud-based, remote controller that controls the UAV as long as the UAV operates within visual sight of the ground based operator; this mode of operation may be described as Telepresence-Line-of-Sight (TLOS). Alternatively, in other examples, Beyond-Line-of-Sight (BLOS) operation may be used, in which a "BLOS" UAV may be launched from anywhere and a cloud-based command center and/or controller may control the BLOS UAV as long as the BLOS UAV remains in communication with the cloud-based command center and/or controller. Put another way, LOS, and TLOS, operation of an UAV may comprise various UAV operating states that may function (e.g. according to jurisdictional rules) only when a pilot is viewing the UAV, and BLOS operation of an UAV may comprise various UAV operating states where the UAV is autonomously or partially autonomously controlled by a remote controller. In some examples, a UAV may switch between LOS, TLOS and BLOS states depending on whether or not a pilot is viewing a UAV that was not previously viewed and/or whether or not a pilot no longer views a UAV that was previously viewed.

Hence, in some examples, the AUAV 118 may comprise a TLOS UAV and, in exchange for access to the restricted airspace boundary, the AUAV 118 may be temporarily controlled and/or operated by the controller 104 as a DFR.

Attention is next directed to FIG. 4, FIG. 5, FIG. 6 and FIG. 7 which depict further aspects of the system 100. FIG. 4, FIG. 5, FIG. 6 and FIG. 7 are substantially similar to FIG. 1, with like components having like numbers.

Figure 4:
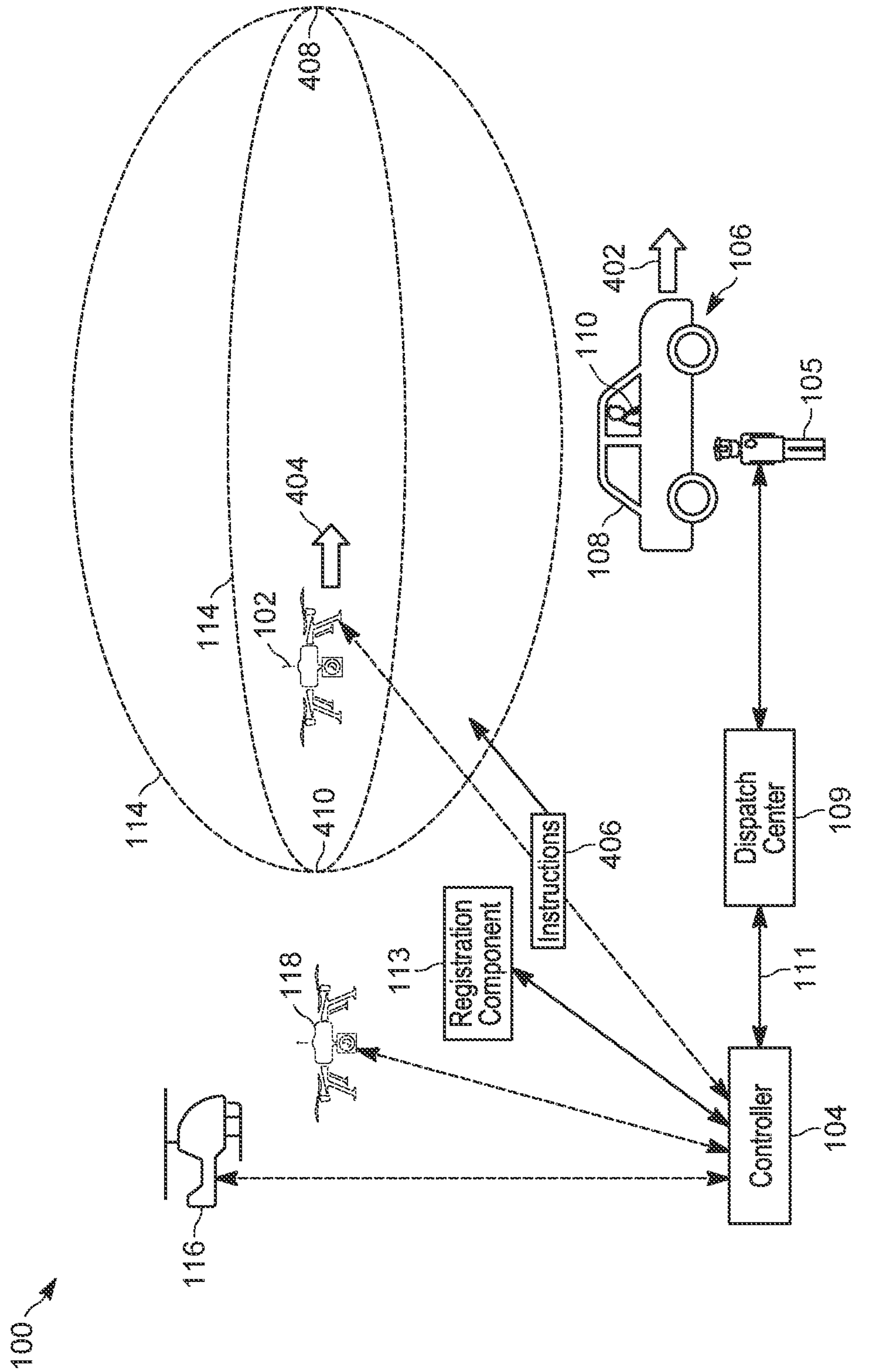
FIG. 4 depicts the incident air space management system of FIG. 1 in a mobile incident mode, in accordance with some examples.

In contrast to FIG. 1, which depicts components of the system 100 in a stationary incident mode, in FIG. 4 illustrates components of the system 100 which have changed to a mobile incident mode. While not all components of the system 100 are depicted in FIG. 4, such as the beacon 115, such components are nonetheless understood to be present.

For example, in FIG. 4, the system 100 is in a mobile incident mode, as the vehicle 108 has started moving, as indicated by an arrow 402, and the incident 106 becomes mobile. Hence the SUAV 102 is being controlled to follow the vehicle 108; for example, the SUAV 102 moves in a direction-of-interest as indicated by an arrow 404. As such, the controller 104 updates the restricted airspace beacon parameters as previously described to extend the restricted air space boundary 114 in the direction-of-interest, and controls the SUAV 102 accordingly, for example via instructions 406. It is understood that the registration component 113 may be updated to indicate the change in mode and/or the updated restricted airspace beacon parameters and/or coordinates of the restricted air space boundary 114, and/or any other suitable information which indicates the restricted air space boundary 114 being mobile, and the like.

In some examples, the controller 104 and/or the registration component 113 may adaptively adjust geofence coordinates representing the restricted air space boundary 114 using predictive analytics, and the like to anticipate and/or predict a direction of travel of the incident 106 (e.g. now understood to be mobile) and correlate to the restricted airspace boundary 114, including, but not limited to, a predicted velocity and/or a predicted direction of travel of the SUAV 102. The SUAV 102 receives the beacon parameters (e.g. in the instructions 406) that modify the RF radiation pattern of the beacon 115, and in conjunction with velocity, directivity, and height data of the SUAV 102 (e.g. that may also be received in the instructions 406), and controls the beacon 115 accordingly. It is understood that operation of the beacon 115 and the SUAV 102 is generally coordinated with a geofence air space boundary registered at the registration component 113.

Given that SUAV 102 is mobile and the restricted air space beacon 115 is located at the SUAV 102, the restricted airspace boundary 114 is both tracking real-time the movement of incident 106 and the restricted airspace boundary 114 may also be extended and/or is skewed and/or is elongated in the direction-of-interest, to indicate the restricted airspace boundary relative to the current location of the SUAV 102. For example a first lobe 408 of an RF radiation pattern comprising the restricted airspace boundary 114, that extends in the direction-of-interest, may be longer than a second lobe 410 of the RF radiation pattern comprising the restricted airspace boundary 114, that extends opposite to the direction-of-interest. Furthermore, the restricted airspace boundary 114 moves with the SUAV 102 given that the restricted air space beacon 115 is located at the SUAV 102. The geofence coordinates registered at the registration component 113 may be further adapted to represent the restricted air space region to account for a flight path of the SUAV 102, so that the restricted air space region follows the SUAV 102.

In other examples, the SUAV 102 may be manually controlled via the controller 104 with the restricted airspace boundary 114 adapted accordingly. Put another way, regardless of whether the SUAV 102 is controlled to move automatically or manually, the restricted airspace boundary 114 is altered according to a mobile incident mode.

Figure 5:
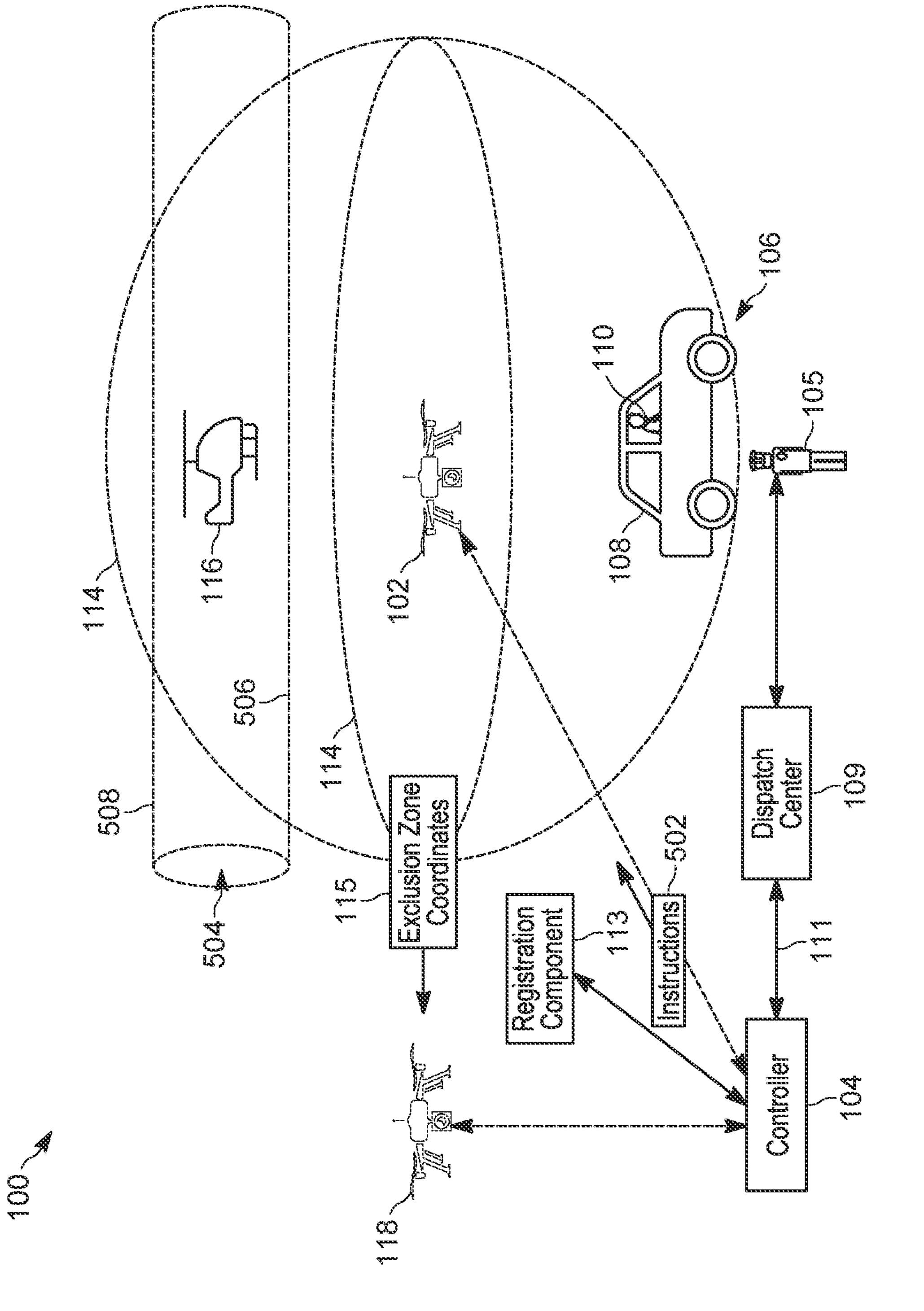
FIG. 5 depicts a temporary exclusion zone of the incident air space management system of FIG. 1, in accordance with some examples.

Attention is next directed to FIG. 5, in which the system 100 is in the stationary incident mode, and which depicts the controller 104 receiving instructions 502 indicating geofence coordinates indicative of a temporary exclusion zone 504 within the restricted air space boundary 114 from the controller 104 (e.g. or alternatively the registration component 113) and communicating any other suitable relevant information to the SUAV 102 which indicates the presence of the temporary exclusion zone 504. As depicted, the temporary exclusion zone 504 is defined in 3-dimensionional space in both the vertical and horizontal dimensioning within the restricted air space boundary 114, the temporary exclusion zone 504 having a lower boundary 506, and at least an upper boundary 508 that defines an exclusion zone region of sufficient volume for the manned aircraft 116 to fly within a registered flight path, the temporary exclusion zone 504 being at least partially within the restricted airspace boundary 114. As depicted, the temporary exclusion zone 504 may be in a shape of a tube and/or cylinder, however the temporary exclusion zone 504 may have any suitable shape. The registration component 113 may store any suitable data associated with the temporary exclusion zone 504 including, but not limited to, geofence coordinates of the temporary exclusion zone 504, a vertical altitude of the temporary exclusion zone 504 and/or the manned aircraft 116, an operator of the manned aircraft 116, and the like.

As depicted, the SUAV 102 may encode coordinates, and the like, of the temporary exclusion zone 504 within the restricted air space beacon 115 such that the coordinates defining the temporary exclusion zone 504 may be received by the AUAV 118, and/or other aircraft, to instruct the AUAV 118 to stay out of the temporary exclusion zone 504. It is understood that a line representing the beacon 115 in FIG. 5 indicates a portion of the RF radiation pattern and/or beacon signal being emitted by the SUAV 102 (e.g. as depicted in FIG. 1), that correlates with the restricted airspace boundary 114. It is further understood that the AUAV 118 (and/or other UAVs and/or aircraft, such as the manned aircraft 116) may receive data encoded in the beacon 115, such as the depicted coordinates, regardless of whether the AUAV 118 is inside or outside the restricted airspace boundary 114.

As depicted, the manned aircraft 116 may fly into, within and/or through the temporary exclusion zone 504. When the manned aircraft 116 leaves the temporary exclusion zone 504, the controller 104 may communicate to the SUAV 102 updated information which causes the SUAV 102 to stop encoding the coordinates of the temporary exclusion zone within the beacon 115, and the temporary exclusion zone 504 within the restricted airspace boundary 114 may be eliminated. In addition, any temporary exclusion zone coordinates recorded at the registration component 113 may be updated so as to eliminate and/or delete the temporary exclusion zone.

Figure 6:
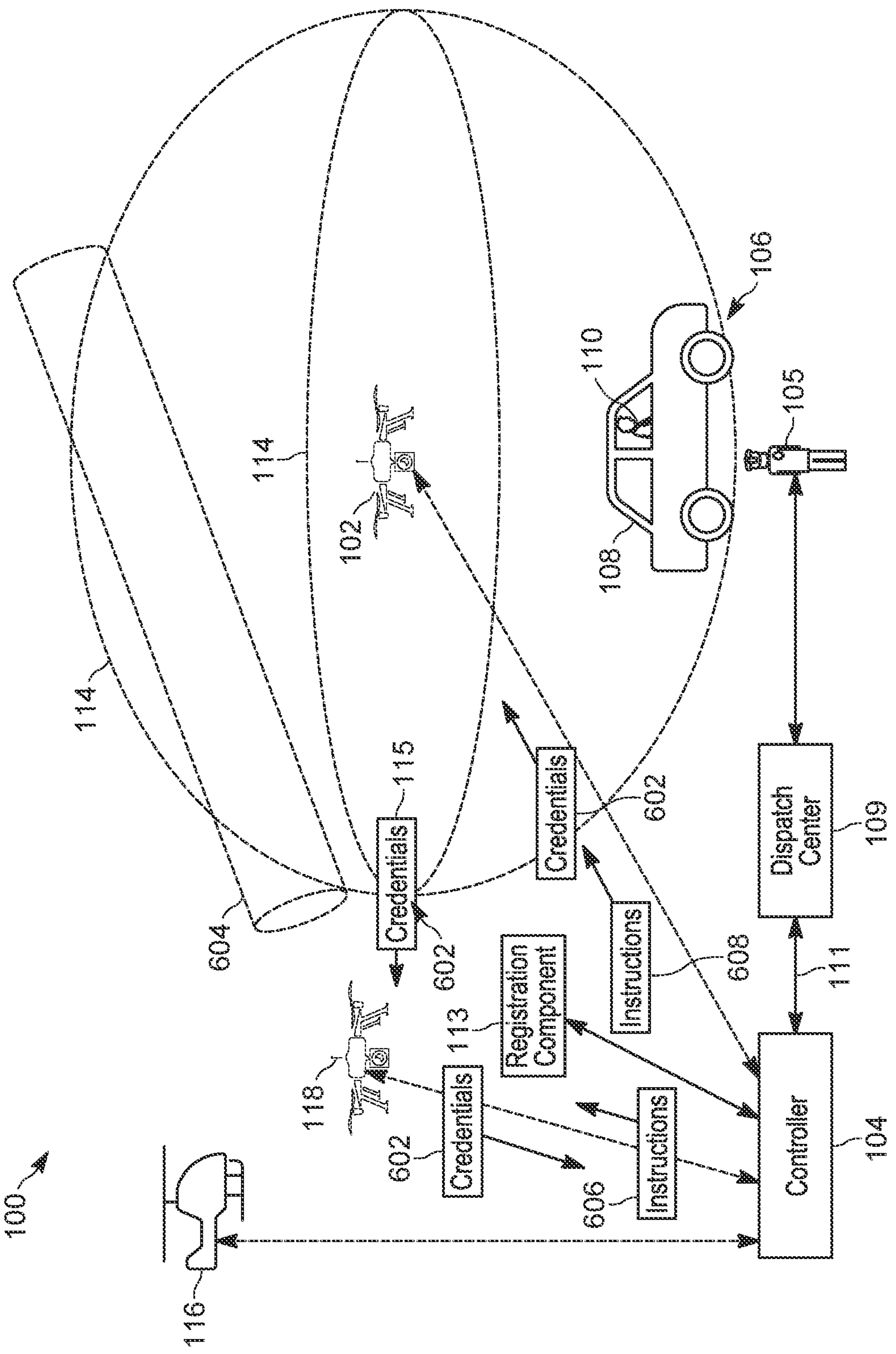
FIG. 6 depicts credentials being provided an ancillary unmanned aerial vehicle of the incident air space management system of FIG. 1, in accordance with some examples.

Attention is next directed to FIG. 6, in which the system 100 is in the stationary incident mode, and which depicts the controller 104 providing credentials 602 to the SUAV 102 which the SUAV 102 may encode in the restricted airspace beacon 115 as previously described. As depicted, the credentials 602 may be received by the AUAV 118 in the restricted airspace beacon 115, and used by the AUAV 118 to log-in to the controller 104, for example via a wireless communication link there between. It is understood that a line representing the beacon 115 in FIG. 6 indicates a portion of the RF radiation pattern and/or beacon signal being emitted by the SUAV 102 (e.g. as depicted in FIG. 1), that correlates with the restricted airspace boundary 114. It is further understood that the AUAV 118 (and/or other UAVs and/or aircraft, such as the manned aircraft 116) may receive data encoded in the beacon 115, such as the depicted credential 602, regardless of whether the AUAV 118 is inside or outside the restricted airspace boundary 114.

The controller 104 may provide to the AUAV 118 appropriate instructions 606 that indicate a localized flight lane 604 within the restricted airspace boundary 114, such that the AUAV 118 may enter the restricted airspace boundary and operate within the localized flight lane 604, in exchange for allowing the controller 104 to operate the AUAV 118 as a DFR. In addition, the geofence coordinates associated with the localized flight lane 604 may be registered at the registration component 113 and assigned to the AUAV 118 such that the AUAV 118 is registered within the system 100, for example along with any suitable telemetry of the AUAV 118 (e.g., AUAV operator and type, flight lane coordinates and purpose, AUAV real-time status, etc.) being logged and tracked by controller 104 and/or registration component 113. As depicted, the controller 104 may also provide instructions 608 to the SUAV 102 that indicate the localized flight lane 604 such that the SUAV 102 is instructed to stay out of the localized flight lane 604 and/or broadcast coordinates of the localized flight lane 604 in the beacon 115 to instruct other aircraft and/or UAVs to stay out of the localized flight lane 604

The controller 104 may manage a plurality of AUAVs 118 (not depicted) that may request access to the restricted air space. For example, the controller 104 may assign unique credentials 602 to each AUAV 118, and grant unique localized flight lane(s) 604 to each particular AUAV 118, which may be assigned to safely manage all aircraft operating within the restricted air space boundary 114. Specifically, there may be a plurality of AUAVs 118 that request access to the restricted air space defined by the restricted air space boundary 114. In some examples, the controller 104 may prioritize each AUAV 118 for access to the restricted air space based on one or more of AUAV operator, type, capability, time allocated to operate within the restricted air space boundary 114, and the like.

Based on a prioritization of the plurality of AUAVs 118, the controller 104 may temporarily grant unique credentials to each AUAV 118 where a credential is associated with a unique localized flight lane 604, and where each localized flight lane 604 is understood to be separate from other localized flight lane 604 within the restricted air space boundary 114 so as to ensure safe aerial operations. It is further understood that each respective temporary localized flight lane 604 also be registered at the registration component, along with respective real-time location information and flight telemetry (e.g., flight direction, altitude, velocity, etc.). Due to changes in the incident 106, such as changes to a mode, type and/or status of the incident 106, localized flight lane 604 may be modified and/or permissions to operate within the restricted air space boundary 114 may be restricted or withdrawn according to such changes to the incident 106. In this way, the controller 104 may function as a type of "control tower" that coordinates access to the restricted air space associated with restricted air space boundary 114, and flight operations therein, of all the AUAVs 118 (and the SUAV 102) within the restricted air space associated with restricted air space boundary 114.

Figure 7:
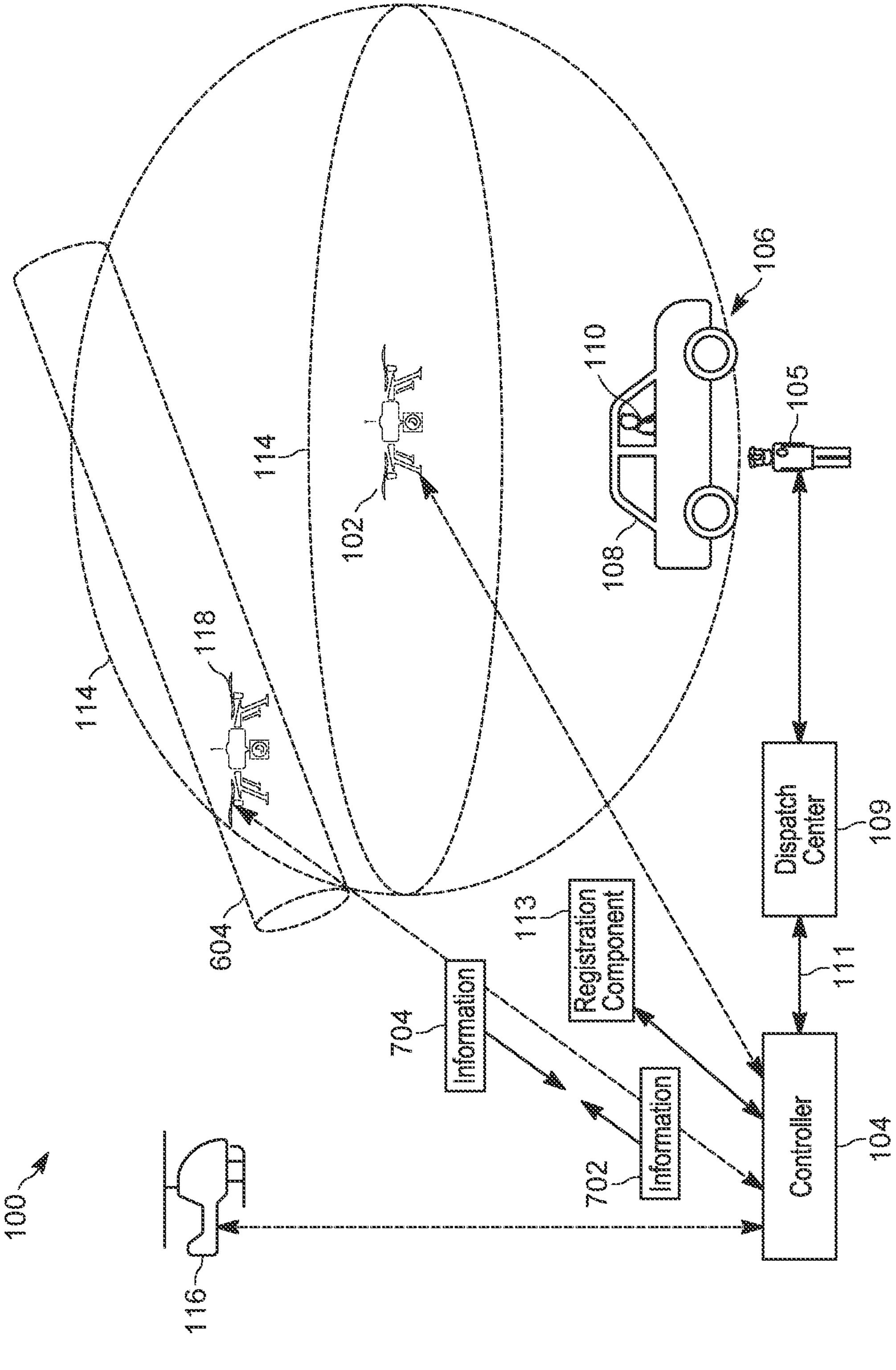
FIG. 7 depicts the ancillary unmanned aerial vehicle temporarily operating a drone as a first responder, in accordance with some examples.

For example, attention is next directed to FIG. 7, which follows FIG. 6 in time (e.g. and the system 100 remains in the stationary incident mode). FIG. 7 depicts the AUAV 118 within the localized flight lane 604 within the restricted airspace boundary 114. The AUAV 118 receives information 702 from the controller 104 (and/or the SUAV 102), which the AUAV 118 may provide to communication devices associated with an operator entity with which the AUAV 118 is associated; such information 702 may include video and/or images acquired by the SUAV 102. Conversely, the AUAV 118 provides information 704 to the controller 104 such as multimedia data (e.g. sensor data, images, video, and the like) acquired by the AUAV 118. The information 704 may assist first responders, and the like, to manage and/or respond to the incident 106. In addition, as previously described in FIG. 6, multiple AUAVs 118 may operate within restricted air space boundary 114, and each AUAV 118 may be managed by the controller 104, and respective telemetry information associated each may be stored at the registration component 113.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, broadcast information, and the like).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context, in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An airspace management system comprising:
a signaling unmanned aerial vehicle (SUAV) associated with a public-safety entity; and
a controller associated with the public-safety entity, the controller configured to:
dispatch the SUAV to a location of a public-safety incident;
generate a restricted airspace boundary for airspace, associated with the public-safety incident, within which the SUAV operates; and
activate a restricted airspace beacon of the SUAV that correlates with the restricted airspace boundary, wherein the restricted airspace beacon comprises a wireless beacon that instructs one or more of other unmanned aerial vehicles and manned aircraft, that receive the wireless beacon, to stay outside the restricted air space boundary, the restricted air space boundary associated with a given distance outside of which the other unmanned aerial vehicles and the manned aircraft are to stay outside of the restricted air space boundary, the restricted airspace boundary comprising a radio-frequency (RF) radiation pattern relative to a current location of the SUAV, a shape of the RF radiation pattern defining a respective shape of the restricted airspace boundary, the RF radiation pattern detectable by the other unmanned aerial vehicles and the manned aircraft to indicate a distance from the SUAV outside of which the other unmanned aerial vehicles and the manned aircraft are to stay,
wherein the SUAV broadcasts the restricted airspace beacon directly to one or more of the other unmanned aerial vehicles and the manned aircraft, the restricted airspace beacon indicating the restricted airspace boundary relative to a current location of the SUAV,
the restricted airspace beacon being operational in at least two incident modes:
a stationary incident mode, during which the SUAV and the restricted airspace boundary are stationary relative to a fixed location of the public-safety incident; and
a mobile incident mode, during which the SUAV and the restricted airspace boundary are mobile and tracking a moving incident location, the restricted airspace boundary moving with the SUAV as the SUAV moves.

2. The airspace management system of claim 1, wherein the controller is further configured to:
adjust the restricted airspace boundary based on incident mobility of the public-safety incident.

3. The airspace management system of claim 1, wherein the controller is further configured to:
modify the restricted airspace boundary based on one or more incident types of the public-safety incident; and
adjust the restricted airspace beacon of the SUAV to correlate with the restricted airspace boundary as modified.

4. The airspace management system of claim 1, wherein the restricted airspace boundary is dynamically adjusted in response to changes in an incident mode, and the restricted airspace beacon is updated in response to the change in the restricted airspace boundary, wherein the restricted airspace beacon, as updated, is broadcast by the SUAV.

5. The airspace management system of claim 4, wherein the RF radiation pattern of the restricted airspace beacon is modified according to the SUAV being in the stationary incident mode or the mobile incident mode.

6. The airspace management system of claim 5, wherein, during the stationary incident mode, the RF radiation pattern of the restricted airspace beacon is symmetrical about the SUAV.

7. The airspace management system of claim 5, wherein, during the stationary incident mode, the RF radiation pattern of the restricted airspace beacon as broadcast by the SUAV is further adjusted by the controller or the SUAV based on an incident type.

8. The airspace management system of claim 5, wherein, during the mobile incident mode, the RF radiation pattern of the restricted airspace beacon is further adjusted by the controller to steer the RF radiation pattern in a selected direction of interest.

9. The airspace management system of claim 1, wherein the controller is further configured to:
determine a flight path of a manned aircraft approaching the location of the public-safety incident;
determine a temporary exclusion zone within the restricted airspace boundary, the temporary exclusion zone encompassing one or more of the flight path of the manned aircraft and a current location of the manned aircraft;
modify the restricted airspace boundary, broadcast by the restricted airspace beacon of the SUAV, to indicate a presence of the temporary exclusion zone within the restricted airspace boundary; and when the manned aircraft leaves the temporary exclusion zone, modify the restricted airspace boundary, broadcast by the restricted airspace beacon of the SUAV, to indicate removal of the temporary exclusion zone.

10. The airspace management system of claim 9, wherein the controller is further configured to:

control the SUAV to stay out of the temporary exclusion zone until the manned aircraft leaves the temporary exclusion zone of the restricted airspace boundary.

11. The airspace management system of claim 1, wherein an ancillary unmanned aerial vehicle (AUAV) receives credentials embedded within the restricted airspace beacon, as broadcast, to access the airspace management system.

12. The airspace management system of claim 11, wherein the AUAV is configured to;

access the controller using the credentials, as received, to request access to the restricted airspace boundary; and receive, from the controller, permissions with control contingencies that designate flight path authorizations within the restricted airspace boundary.

13. The airspace management system of claim 11, wherein the controller is further configured to:

identify a type of the AUAV operating in proximity to the public-safety incident;

grant temporary access of the AUAV to a localized flight lane within the restricted airspace boundary, the localized flight lane defining a path within the restricted airspace boundary within which the AUAV may operate; and communicate the localized flight lane to the AUAV via one or more of:

peer-to-peer communications between the SUAV and AUAV; and

AUAV communications directly to the controller of the airspace management system.

14. The airspace management system of claim 11, wherein the SUAV is configured as a drone as first responder (DFR) and the AUAV is configured as a telepresence line of sight (TLOS) UAV, and the credentials granted by the controller allow the AUAV to temporarily operate as a DFR within the restricted airspace boundary.

15. A method comprising:

dispatching, via a controller associated with a public-safety entity, a signaling unmanned aerial vehicle (SUAV), associated with the public-safety entity, to a location of a public-safety incident;

generating, via the controller, a restricted airspace boundary for airspace, associated with the public-safety incident, within which the SUAV operates; and activating, via the controller, a restricted airspace beacon of the SUAV that correlates with the restricted airspace boundary, wherein the restricted airspace beacon comprises a wireless beacon that instructs one or more of other unmanned aerial vehicles and manned aircraft, that receive the wireless beacon, to stay outside the restricted air space boundary, the restricted airspace boundary comprising an radio-frequency (RF) radiation pattern relative to a current location of the SUAV, a shape of the RF radiation pattern defining a respective shape of the restricted airspace boundary, the RF radiation pattern detectable by the other unmanned aerial vehicles and the manned aircraft to indicate a distance from the SUAV outside of which the other unmanned aerial vehicles and the manned aircraft are to stay, wherein the SUAV broadcasts the restricted airspace beacon, the restricted airspace beacon indicating the restricted airspace boundary relative to a current location of the SUAV, the restricted airspace beacon being operational in at least two incident modes:

a stationary incident mode, during which the SUAV and the restricted airspace boundary are stationary relative to a fixed location of the public-safety incident; and a mobile incident mode, during which the SUAV and the restricted airspace boundary are mobile and tracking a moving incident location.

16. The method of claim 15, further comprising:

adjusting the restricted airspace boundary based on incident mobility of the public-safety incident.

17. The method of claim 15, further comprising:

modifying the restricted airspace boundary based on one or more incident types of the public-safety incident; and adjusting the restricted airspace beacon of the SUAV to correlate with the restricted airspace boundary as modified.

18. The method of claim 15, further comprising:

determining a flight path of a manned aircraft approaching the location of the public-safety incident;

determining a temporary exclusion zone within the restricted airspace boundary, the temporary exclusion zone encompassing one or more of the flight path of the manned aircraft and a current location of the manned aircraft;

modifying the restricted airspace boundary, broadcast by the restricted airspace beacon of the SUAV, to indicate a presence of the temporary exclusion zone within the restricted airspace boundary; and when the manned aircraft leaves the temporary exclusion zone, modifying the restricted airspace boundary, broadcast by the restricted airspace beacon of the SUAV, to indicate removal of the temporary exclusion zone.

19. The method of claim 15, further comprising:

identifying a type of an ancillary unmanned aerial vehicle (AUAV) operating in proximity to the public-safety incident;

granting temporary access of the AUAV to a localized flight lane within the restricted airspace boundary, the localized flight lane defining a path within the restricted airspace boundary within which the AUAV may operate; and communicating the localized flight lane to the AUAV via one or more of:

peer-to-peer communications between the SUAV and AUAV; and

AUAV communications directly to the controller.

20. The method of claim 19, further comprising:

providing credentials to the SUAV to embed within the restricted airspace beacon, as broadcast, the credentials enabling access to an airspace management system of which the controller and SUAV are components; and receiving the credentials from the AUAV and in response granting the temporary access of the AUAV to the localized flight lane, wherein the SUAV is configured as a drone as first responder (DFR) and the AUAV is configured as a telepresence line of sight (TLOS) UAV, and the credentials allow the AUAV to temporarily operate as a DFR within the restricted airspace boundary.

* * * * *